United States Patent Office 3,730,934
Patented May 1, 1973

---

3,730,934
PLASTICIZED LACTONE POLYMER COMPOSITION
Roy F. Wright, Bartlesville, Okla., assignor to
Phillips Petroleum Company
No Drawing. Filed Aug. 27, 1971, Ser. No. 175,707
Int. Cl. C08f 45/36
U.S. Cl. 260—31.6    10 Claims

ABSTRACT OF THE DISCLOSURE

A plasticized lactone polymer composition comprising a polyester having a molecular weight in the range of about 1,000 to about 10,000 and a polymer of a lactone and a conjugated diene.

---

It is desirable to provide a plasticized lactone polymer composition having high tensile strength, good elongation and modulus but reduced hardness and improved processability. Heretofore lactone polymers had demonstrated greatly decreased tensile strength relative to the value of these properties in the lactone polymer prior to plasticization, when plasticized with conventional plasticizers of various types for the purpose of providing softer, easier processing lactone polymer compositions. This sometimes caused serious problems where the resultant composition was utilized for applications which were dependent on the high green tensile strength of the lactone copolymers such as in the fabrication of tubing or film for example, or for the forming of other materials.

This invention therefore resides in a plasticized lactone polymer composition comprising a polyester plasticizer having a molecular weight in the range of about 1,000 to about 10,000 and a copolymer of a conjugated diene monomer having from about 4 to about 12 carbon atoms per molecule and a lactone, said composition having improved physical properties relative to heretofore plasticized lactone copolymer compositions.

Suitable polyesters for use as plasticizers for forming the composition of the instant invention are those having a molecular weight of from about 1,000 to about 10,000. At polyester molecular weights less than about 1,000 the resultant composition exhibits undesirably rapid loss of the plasticizer by processes such as bleeding out, extraction, volatilization, or combinations thereof. At polyester molecular weights greater than about 10,000, the resultant composition exhibits decreased efficiency of plasticization and increased difficulty of mixing the plasticizer with the lactone copolymer.

Polyesters that can be utilized for forming the composition of this invention are polyesters formed from dibasic acids and dihydroxy compounds. For example, polyesters of adipic acid, azelaic acid, sebacic acid, and other dibasic acids are suitable. The hydroxy component that is combined with the dibasic acid in forming these polyesters can be, for example, 1,2-propylene glycol, neopentyl glycol, or other dihydroxy compounds. Preferred polyesters are, for example, a poly-1,2-propylene sebacate, polyneopentyl adipate, poly-1,3-butylene sebacate, poly-1,2-propylene adipate, and poly-1,2-propylene azelaiate. These polyesters can be in the form of liquids, semi-solids, or solids, and can be employed as mixtures thereof.

The lactone polymer which is plasticized by the polyesters to form the composition of the instant invention has at least about 15 percent to about 85 percent lactone by weight based on the total polymer composition. Where the combined lactone content is less than about 15 percent by weight, properties such as ozone resistance and tensile strength tend to decrease. Where the lactone content is greater than about 85 percent by weight, elastomeric properties such as elongation decrease and brittleness increases. This lactone can be combined in a lactone block polymer in one or more blocks or segments within a polymer molecule by a ring opening polymerization. The remaining portion of the lactone polymer or lactone block polymer is derived from a monomer selected from conjugated dienes having from about 4 to about 12 carbon atoms per molecule, such as, for example, 1,3-butadiene, isoprene, and piperylene.

The lactone polymer can also be a copolymer which has, in addition to the conjugated diene monomer segment, a vinyl aromatic hydrocarbon having from about 8 to about 20 carbon atoms per molecule, such as for example styrene, 4-methylstyrene, and 1-vinylnaphthalene. Also suitable are copolymers wherein the combined conjugated diene and vinyl aromatic compound are present as a copolymer attached to the portion derived from the lactone monomer. The preferred lactone copolymers employed in this invention are those which exhibit the characteristics of vulcanized rubbers while in an uncured condition and which at higher temperatures are flowable thermoplastic elastomers. These copolymers possessing 50 percent or more by weight polymerized conjugated diene are generally rubbery in nature as preferred and those having less than about 50 percent by weight of polymerized conjugated diene are resinous in nature.

Specific examples of lactone polymers that have been found to be suitable for plasticizing in forming the composition of this invention are:

styrene/butadiene/lactone* (25/50/25)
styrene/butadiene/lactone* (20/60/20)
butadiene/lactone (20/80)
styrene/butadiene/lactone* (20/20/60)

*Lactone=epsilon-caprolactone.

wherein the monomers are combined in homopolymer blocks in an end-to-end relationship in the order shown and in the relative amounts shown by the numbers in parentheses. Lactone copolymers are known in the art and the method for forming said polymers can be found, for example, in U.S. Pat. 3,585,257.

The amount of polyester plasticizer utilized for forming the composition of this invention is about 3 to about 200 parts by weight of the polyester per 100 parts by weight of the lactone polymer, preferably about 10 to about 60 parts by weight polyester per 100 parts by weight of the lactone polymer. At polyester weights less than about 3 parts per 100 parts by weight of lactone copolymer, plasticization is not achieved to any significant extent. At polyester weights greater than about 200 parts per 100 parts by weight of lactone copolymer, properties of the composition begin to be dominated by the plasticizer.

The lactone polymers which are plasticized with the polyesters to form the composition of the instant invention can also be compounded with fillers such as carbon black, clays, silicas, and other filler material as known in the art. In the composition of this invention, it is preferred that the filler material be in a range of about 10 to about 400 parts by weight per 100 parts by weight of the lactone polymer.

While curatives or vulcanizing agents, as known in the art, are not generally compounded with the plasticized lactone polymer composition of this invention, they can be included. Examples of curatives which can be used are for example peroxides, sulfur, and sulfur cure accelerators.

Antioxidants can also be included. Where an antioxidant is utilized, said antioxidant is added in an amount to provide the desired protection against oxidation, preferably in the range of about 0.5 to about 1.5 parts by weight per 100 parts by weight of the lactone polymer.

Other additives that can be compounded in the composition of this invention are, among others, pigments or colorants, resins which aid in tackifying the composition, mold release agents, and gloss improvers, as known in the art.

The polyester plasticizer can be added to the lactone polymer in a variety of ways, such as, for example, adding the polyester plasticizer to a solution of the polymer before said polymer is recovered. Subsequent recovery provides a master batch of polymer and plasticizer. The polyester can also be added to the lactone copolymer in an internal mixture or on a roll mill such as is employed in rubber compounding operations. The polyester plasticizer can also be added in one or several portions to the lactone copolymer. If large amounts of fillers and/or the plasticizer are employed, it is preferred that said constituents be added in several portions. It is also preferred that the majority of the plasticizer is added after any utilized filler has been added in order to aid in the dispersion of both filler and plasticizer in the lactone copolymer.

The following is an example comparing the properties of various plasticized lactone polymer compositions of this invention with plasticized lactone polymer compositions wherein other conventional plasticizers were employed.

EXAMPLE

Runs were made in which a tough, hard styrene/1,3-butadiene/epsilon-caprolactone (20/20/60) copolymer was mixed with various plasticizers in the compounding recipe shown below.

COMPOUNDING RECIPE

| | Parts by weight |
|---|---|
| Lactone block copolymer | 100 |
| Hi-Sil 210 [a] | 30 |
| Stearic acid | 1 |
| Plasticizer | 20 |

[a] Hydrated silica pigment of extremely fine particle size.

Each of the stocks was prepared by adding the stearic acid and one-half of the filler to the lactone copolymer on a 4 x 9 inch roll mill at about 190° F. The remaining one-half of the filler was added followed immediately by the plasticizer. Samples of the stocks were then molded at about 307° F. for about 10 minutes to prepare test specimens for the determination of physical properties. The results of these tests are shown in the table below.

TABLE

| Run No. | Plasticizer, 20 phr. | 300% modulus, p.s.i. | Tensile, p.s.i. | Elongation, percent | Shore D hardness |
|---|---|---|---|---|---|
| 1 | None | 1,350 | 3,230 | 710 | 50 |
| 2 | Polyester [a] | 1,090 | 2,740 | 790 | 44 |
| 3 | Polyester [b] | 1,070 | 2,690 | 770 | 45 |
| 4 | Circosol 42XH [c] | 950 | 1,970 | 690 | 42 |
| 5 | DOP [d] | 680 | 930 | 510 | 37 |
| 6 | TCP [e] | 760 | 1,160 | 580 | 40 |

[a] A polyneopentyl adipate of about 1,160 molecular weight.
[b] A poly-1,2-propylene sebacate of about 3,200 molecular weight.
[c] Naphthenic type oil from petroleum.
[d] Dioctyl phthalate.
[e] Tricresyl phosphate.

The results in the above table demonstrate that the polyester plasticizers of this invention provided softer stocks of lower stiffness than the control run with no plasticizer added (Run 1). However, these plasticizers (Runs 2 and 3) caused only a modest decrease in the tensile strength compared to the control in contrast to the severe drop in tensile strength caused by the other types of plasticizers (Runs 4-6).

In the above tests, tensile strength, elongation and 300% modulus were determined according to the method of ASTM D-412-66. Shore D hardness was determined according to the procedure of ASTM D-2240-68.

It can be seen from the above example that the plasticized lactone block polymer of this invention has improved softness and flexibility while maintaining a high tensile strength relative to the heretofore utilized plasticized lactone polymers.

Other modifications and alterations of this invention will become apparent to those skilled in the art from the foregoing discussion and example and it should be understood that this invention is not to be unduly limited thereto.

What is claimed is:

1. A plasticized lactone block polymer composition, comprising:

a linear, saturated polyester having a molecular weight in the range of about 1,000 to about 10,000 and a lactone block polymer of a conjugated diene monomer having from about 4 to about 12 carbon atoms per molecule with about 15 to about 85 percent by weight of said lactone block polymer being polymerized lactone and said plasticized lactone block polymer being about 3 to about 200 parts by weight polyester per 100 parts by weight lactone block polymer.

2. A composition, as set forth in claim 1, wherein the polyester is one of poly - 1,2 - propylene sebacate, polyneopentyl adipate, poly - 1,3 - butylene sebacate, poly-1,2 - propylene adipate, or poly - 1,2 - propylene azelaiate in an amount of about 10 to about 60 parts by weight per 100 parts by weight of the lactone block polymer.

3. A composition, as set forth in claim 1, wherein the lactone block polymer comprises about 20 percent by weight butadiene and about 80 percent by weight lactone.

4. A plasticized lactone block polymer composition, as set forth in claim 1, including about 10 to about 400 parts by weight filler material per 100 parts by weight of the plasticized lactone block polymer.

5. A plasticized lactone block polymer composition, as set forth in claim 1, including about 0.5 to about 1.5 parts of antioxidant per 100 parts by weight of the plasticized lactone block polymer.

6. A plasticized lactone block polymer, as set forth in claim 1, wherein the lactone block polymer is a copolymer of the conjugated diene monomer and a vinyl aromatic hydrocarbon monomer having about 8 to about 20 carbon atoms per molecule.

7. A composition, as set forth in claim 6, wherein the conjugated diene monomer is one of butadiene, isoprene, or piperylene and the vinyl aromatic hydrocarbon monomer is one of styrene, 4-methylstyrene, or 1-vinylnaphthalene.

8. A composition, as set forth in claim 6, wherein the lactone block copolymer comprises about 20 percent styrene, about 20 percent lactone and about 60 percent butadiene.

9. A composition, as set forth in claim 6, wherein the lactone block copolymer comprises about 20 percent styrene, about 20 percent butadiene, and about 60 percent lactone.

10. A composition, as set forth in claim 6, wherein the lactone block copolymer comprises about 25 percent styrene, 25 percent lactone, and about 50 percent butadiene.

References Cited

UNITED STATES PATENTS 3,474,062 10/1969 Smith et al. _____ 260—31.6 X

LEWIS T. JACOBS, Primary Examiner

U.S. Cl. X.R.

260—37 R